United States Patent [19]

Wei et al.

[11] Patent Number: 5,028,367
[45] Date of Patent: Jul. 2, 1991

[54] TWO-STAGE FAST DEBINDING OF INJECTION MOLDING POWDER COMPACTS

[75] Inventors: Tai-Shing Wei, Troy; Randall M. German, Latham, both of N.Y.

[73] Assignee: Rensselaer Polytechnic Institute, Troy, N.Y.

[21] Appl. No.: 449,129

[22] Filed: Dec. 8, 1989

Related U.S. Application Data

[63] Continuation-in-part of Ser. No. 231,954, Aug. 15, 1988, abandoned.

[51] Int. Cl.⁵ .............................................. C04B 33/32
[52] U.S. Cl. ...................................... 264/63; 264/345; 419/5; 419/10; 419/44; 419/54; 419/58
[58] Field of Search ................... 264/63, 344; 419/44, 419/54, 38, 5, 10

[56] References Cited

U.S. PATENT DOCUMENTS

| | | | |
|---|---|---|---|
| 4,113,480 | 9/1978 | Rivers | 264/63 |
| 4,197,118 | 4/1980 | Wiech | 264/63 |
| 4,305,756 | 12/1981 | Wiech | 75/211 |
| 4,404,166 | 9/1983 | Wiech | 264/63 |
| 4,704,242 | 11/1987 | Bandyopadhyay | 264/63 |
| 4,713,206 | 12/1987 | Matsuhisa | 264/344 |

FOREIGN PATENT DOCUMENTS 60-118664 6/1985 Japan .
61-77671 4/1986 Japan .
1-184204 7/1989 Japan .

*Primary Examiner*—James Derrington
*Attorney, Agent, or Firm*—Notaro & Michalos

[57] ABSTRACT

A process for making molded objects utilizes powder injection molding techniques. Powder is mixed with a binder and then cast into a compact. The compact is then subjected to a first debinding step in the presence of a wicking agent under gentle heating. In this first stage, at least 40% of the binder is removed. Additional binder is then removed in a subsequent higher temperature stage to produce a compact which is free of binder and free of cracks.

4 Claims, 4 Drawing Sheets

TWO-STAGE FAST DEBINDING OF INJECTION MOLDING POWDER COMPACTS

CROSS REFERENCE TO RELATED APPLICATION

This is a continuation-in-part application of Ser. No. 07/231,954, filed Aug. 15, 1988, and now abandoned.

FIELD AND BACKGROUND OF THE INVENTION

The present invention relates in general to the process of powder injection molding (PIM), and, in particular, to a new and useful process for removing binder from a molded powder compact in two stages.

The technology of injection molding plastics has advanced to a state of precision where plastic components having very complex shapes can be formed economically. In its simplest form, injection molding involves heating a plastic to a temperature where it can flow and then forcing the plastic into a shaped cavity where it is cooled. While this is similar to metal casting, greater precision and finer surface detail are possible for injection molded plastic objects. These objects are structurally inferior in comparison with objects made of metal, however.

The injection molding of filled polymers with dispersed metallic or ceramic powders is a recognized technique for improving the strength of the polymers. Filled polymers are composites which incorporate the ease of fabrication of a polymer and the mechanical, thermal, magnetic and electrical properties of the filler. Until recently, the highest concentrations of fillers were in magnetic materials where the polymer served the role of a binder. See R. P. Kusy, "Applications," *Metal-Filled Polymers*, S. K. Bhattacharya (ed.), Marcel Dekker, New York, NY, 1986, pp. 1-142.

A recent development in this field is to maximize the content of solid particles and to actually remove the polymer binder during a sintering operation. As a consequence, a new powder forming process has evolved which permits the complexity of shape and low cost of injection molded plastics, while having high performance properties characteristic of metals, ceramics, cermets (ceramic plus metal) and other composites. This new process is termed powder injection molding (PIM).

The steps involved in forming a component by PIM, include:
1. Selection and tailoring of a powder for the process;
2. Mixing the powder with a suitable binder;
3. Production of homogeneous granular pellets of mixed powder plus binder;
4. Forming a part by injection molding in a closed die;
5. Processing the formed part to remove the binder (termed debinding);
6. Densification of the compact by high temperature sintering; and
7. Post-sintering processing as needed, including heat treatment, further densification or machining.

The binder may be thermoplastic polymeric material, water or various inorganic substances. These have all been used successfully in PIM. The amount of binder ranges from 15% to 50% by volume of the mixture. The particles tend to be small in size to aid in the sintering densification step, although this proves expensive and sometimes produces problems with flow into the die. Some progress has been made using powders as large as 100 micrometers. The injection molding step is similar to that used for molding conventional polymeric materials and involves concurrent heating and pressurization cycles. After molding, binder removal from the powder compact can be a slow step and a source of problems. Various thermal, solvent and capillary extraction approaches are in use. By sintering, void spaces remaining after removal of the binder are eliminated with commensured shrinkage. Isotropic powder packing allows for predictable and uniform shrinkage. The dies used in PIM are thus generally over-sized to accomodate for the final compact dimensions and powder packing density. The resulting compact has micro structural homogeneity and isotropic properties which are superior to those available with many other processes. Generally, the sintering density for an item made by PIM exceeds 93% of theoretical as compared with less than 85% density, that is often attained in die compacted materials. Furthermore, the pores that do remain in PIM compacts are not interconnected or are small spherical spores.

These cause less detriment to the properties of the compact and, consequently, the properties of PIM compacts are very attractive.

These favorable characteristics are further enhanced by the economical and versatile nature of PIM.

References that discuss powder injection molding processes include:

A. R. Erickson and H. E. Amaya, "Recent Developments in Injection Moulding of PM Parts," *Metal Powder Report*, 1985, vol. 40, pp. 484-489;

R. Billet, "Plastic Metals; The Injection Molded P/M Materials Are Here," *Proceedings P/M-82*, Associazione Italiana di Metallurgia, Milano, Italy, 1982, pp. 603-610.

H. Reh, "High Performance Ceramics I. Definition and Economic Significance," *Powder Metallurgy International*, 1986, vol. 18, pp. 84-86; and A. R. Erickson and R. E. Wiech, Jr., "Injection Molding," *Metals Handbook*, Vol. 7, ninth edition, American Society for Metals, Metals Park, OH, 1984, pp. 495-500.

The economical advantages of PIM are disclosed in A. R. Erickson and H. E. Amaya, "Recent Developments in Injection Moulding of PM Parts," *Metal Powder Report*, 1985, Vol. 40, pp. 484-489; and B. Williams, "Current Status of Injection Molding of Metal Powders and Ceramics," *Metal Powder Report*, 1986, Vol. 41, pp. 359-364.

Some of the superior properties of PIM products are disclosed in:

R. J. Walkar and B. R. Patterson, "P/M Injection Molding," *Horizons of Powder Metallurgy*, Part II, W. A. Kaysser and W. J. Huppmann (eds.), Veriag Schmid, Freiburg, West Germany, 1986, pp. 661-665;

R. Billet, "Plastic Metals; From Fiction to Reality with Injection Molded P/M Materials," *Progress in Powder Metallurgy*, 1982, vol. 38, pp. 45-52; and R. Billet, "Net-Shape Full Density P/M Parts by Injection Molding," *International Journal of Powder Metallurgy and Powder Technology*, 1985, vol. 21, pp. 119-129.

U.S. Pat. No. 4,713,206 to Matsuhisa et al. discloses the use of a rigid ceramic body having an open structure for supporting a casting during a de-waxing step for receiving binder from the casting. It is essential in this reference to carefully and accurately machine the surface of the ceramic body which receives the casting. Only relatively slow heating rates of not more than 100° C. per hour are permitted and preferably not more than 10° C. per hour. Japanese patent 61-77671 is relevant for its showing of a defatting process for a ceramic body which apparently is embedded in a heat resistant powder. A single step process is disclosed and, while a purpose of the reference is to reduce defatting time, it is not clear whether accelerated heating rates are possible.

The following U.S. patents are also relevant to the PIM process: U.S. Pat. Nos. 4,113,480 to Rivers and 4,197,118, 4,305,756 and 4,404,166, all to Wiech.

SUMMARY OF THE INVENTION

The present invention comprises a process for making a molded object using a powder injection molding technique where binder is removed in two stages. The first debinding stage involves removing a critical amount of binder from the object after it has been compacted, preferably through a wicking medium. Subsequently, additional binder is removed in a fast high temperature debinding stage.

It was found that by practising the invention, debinding could take place very quickly without detracting from the quality of the compacts, or from the quality of the objects ultimately formed from the compacts.

In the first debinding stage, at least 30% and preferably more than 40% of the binder, is removed, preferably by wicking. If less than 30% of the binder is removed in this first stage, a subsequent isothermal treatment of the compact to remove remaining binder results in cracks in the sample. Predictably crack free compacts were achieved when at least 40% of the binder was removed during the initial low temperature stage. The second isothermal high temperature stage was then successful in removing remaining binder without adversely affecting the compact.

Debinding by slow heating only has the disadvantage that it requires several days to completely remove the binder from the compact. The fully debinded sample is very fragile and difficult to move from the debinding furnace where the binder was removed, to a sintering furnace for subsequent processing.

Where only wicking is used, removal of binders is greatly increased. Wicking efficiency, however, decreases with time or binder saturation. Consequently, a total binder removal at relatively low temperatures is not possible. Debinding temperatures should eventually reach the debinder decomposition temperature to vaporize and remove all the remaining binder. However, as the binder decomposes and vaporizes, the wicking powder impedes, rather than assists, binder removal. Also, the debinded samples are again weak and are usually left in the wicking powder as support for final sintering. Samples may become contaminated from the wicking powder at high temperatures, either from impurities or from leftover binder.

The present invention combines the advantages of both slow heating and wicking, while avoiding their adverse effects and limitations.

In the first debinding stage of the present invention, lower temperatures may be utilized, and it is even necessary when wicking action is used alone. This is because major binder decomposition is not necessary in this first stage. The use of lower binding temperature equipment also results in low investment costs for such equipment. Low temperature ovens operated under ambient atmosphere can be utilized. Recycling of binder from the wicking powder is also possible.

In experiments that were conducted to confirm the usefulness of the present invention, samples that were subjected to the first debinding step had good green strength. A sample with 85% of the binder removed was still strong enough for handling. The debinding and following sintering then can be treated using conventional de-lubrication and sintering practices, using the same sintering equipment. With no external impediment to binder vaporization in the second stage, debinding speed is also faster than using wicking powder alone. Since the second stage takes place without the need for the wicking, medium contamination of the sample is avoided.

The first stage of the present invention may also be conducted using compressed air, fluid, or other mechanical means, rather than wicking powder. This avoids the labor intensive process of removing the binder from the wicking powder and may eventually lead to an automated process.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
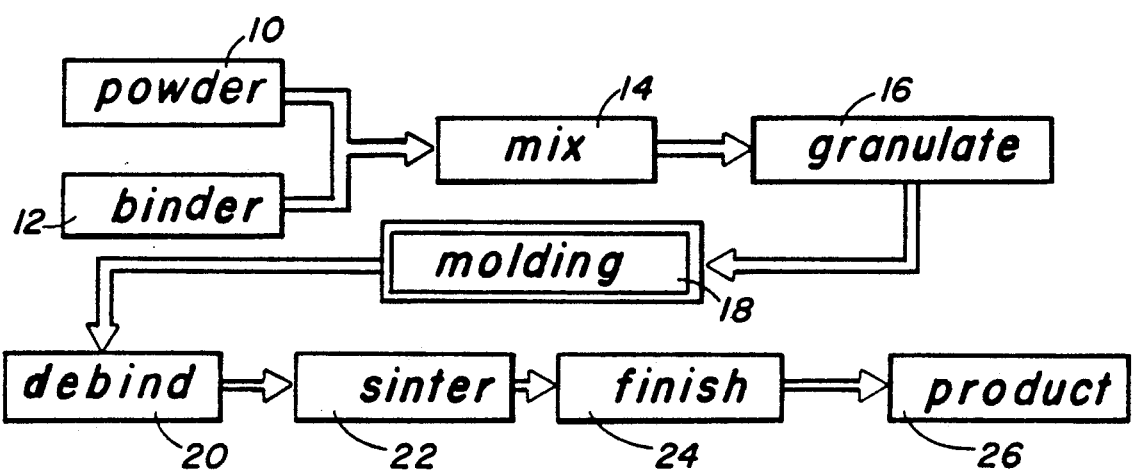
FIG. 1 is a block diagram showing a powder injection molding process to which the present invention can be applied.

Referring to the drawings in particular, FIG. 1 illustrates a PIM process. Powder at 10 having desired composition and characteristic is mixed with binder at 12 in a mixing step 14. The mixture is then granulated at 16 and molded in a die or mold 18 generally under pressure and elevated temperature to form a compact. The compact is then subjected to debinding or de-lubrication at 20 to remove all traces of binder from the compact. The binder free compact is then sintered at 22, in a furnace at substantially elevated temperature. The rough product is then subjected to finishing at 24, such as heat treatments, machining or the like to yield the final product 26.

In accordance with the present invention, the debinding process 20 is a two-stage process, involving, a first stage, wherein at least 30%, and preferably more than 40% of the total binder in the compact is removed at temperatures above the melting point of the binder, but below the vaporization point thereof. Remaining binder is then removed in a second higher temperature stage which involves vaporization and/or decomposition of the remaining binder, preferably under isothermal conditions. The resulting compact is then available for sintering 22 and finishing 24.

Figure 2:
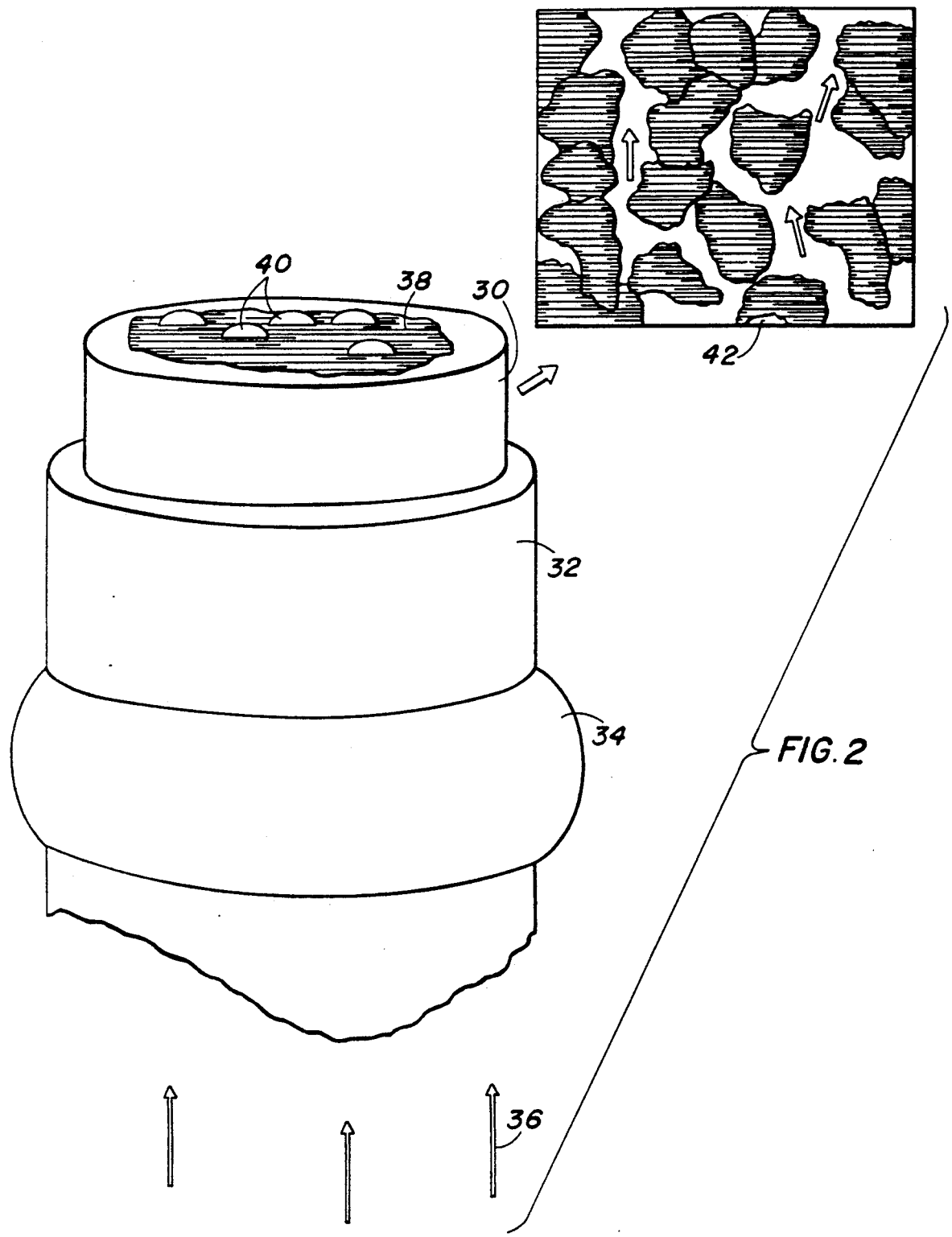
FIG. 2 is a schematic illustration of an experiment which was conducted to determine the effect that the first debinding step of the present invention has on the open porosity of a compact sample.

The first stage is preferably conducted using a wicking medium around the compact to soak up binder as it melts and flows away from the compact. If less than 30% of the binder is removed, subsequent isothermal treatment resulted in cracks in the compact. A transition behavior apparently exists between 30% and 40% binder removal. At 40% binder removal and above, a critical weight loss is achieved which provides sufficient channel opening so that the subsequent high temperature binder removal stage is successful and vaporizing or decomposing remaining binder without fracturing the sample. FIG. 2 is a schematic representation of an experiment which was conducted to demonstrate the porosity produced by the first debinding stage of the present invention. A cylindrical compact sample 30 was formed in accordance with steps 10, 12, 14, 16 and 18 of FIG. 1. The first binder removal stage of the invention was then practised to remove 2.05% by weight of the binder which corresponds to approximately 40% of the binder. To test for the presence of air passages through sample 30, the sample was circumferentially engaged by a rubber hose 32, which was held by a ring 34, tightly against the sample 30. Air was forced through the lower surface of sample 30 in the direction of arrows 36 at 5 psi. A liquid leak detector 38 which was spread on the upper surface of sample 30 showed several air bubbles 40 that indicated the passage of air through the sample. As the air pressure was increased to 10 psi, more bubbles were formed. A correlation thus exists between binder removal beyond the critical amount and channel opening formation. Presumably, a free passage of decomposed binder molecules through these channels provides a faster debinding and a crack free sample. The first stage wicking process partially opens the pore structure as shown at insert 42 in FIG. 2, thereby allowing rapid evaporation without cracking in the compact, in the second debinding stage.

Figure 3:
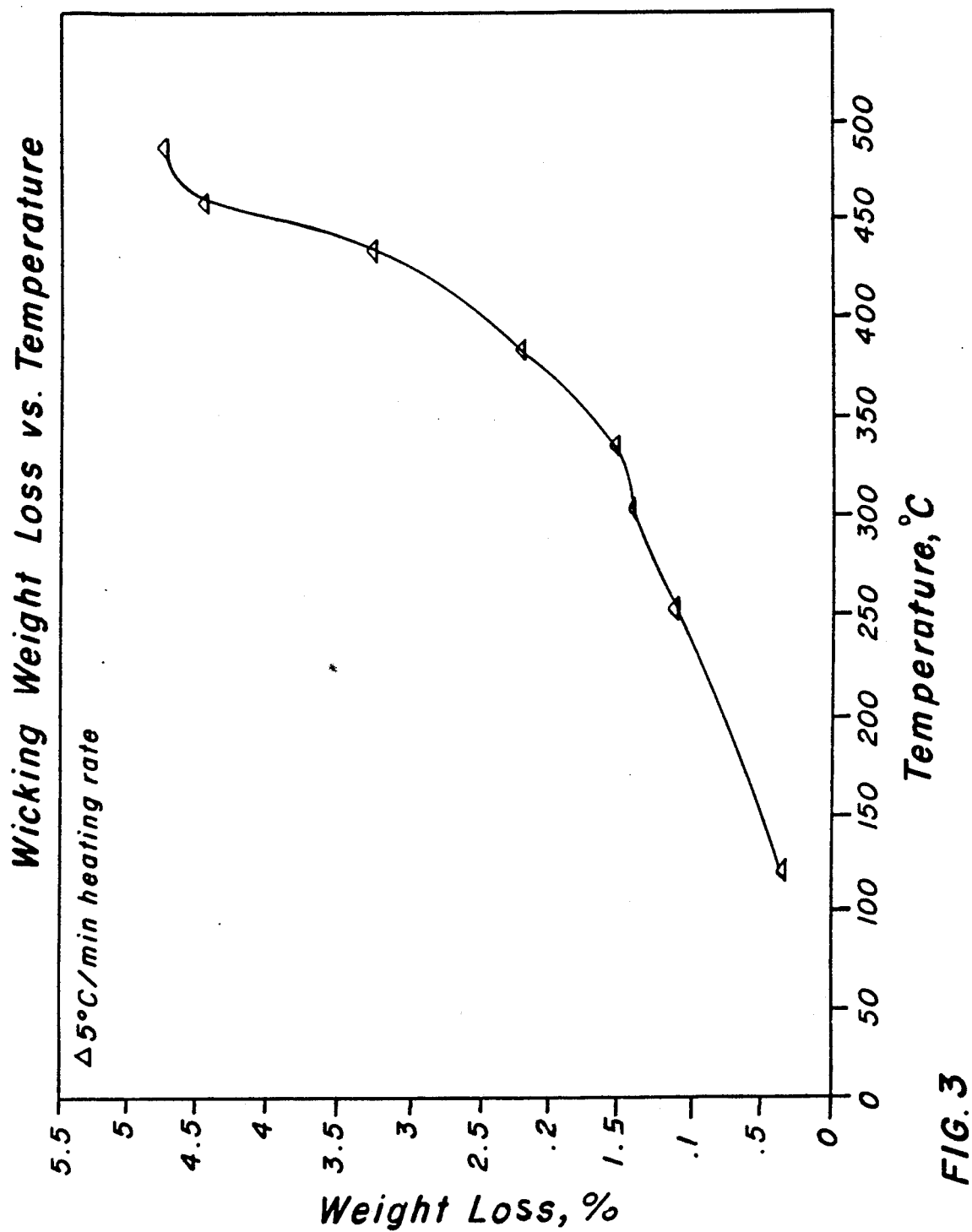
FIG. 3 is a graph plotting weight loss of binder against temperature during the first debinding stage of the present invention.

FIG. 3 shows the effect of temperature on weight loss of binder when in the presence of a wicking medium. Samples made in accordance with the present invention were heated at 5° C./min. to each temperature shown by triangles in FIG. 3. At each stage, the samples were soaked in a wicking medium for five minutes. Weight loss is appreciable even at 120° C. as illustrated in FIG. 3, and increases rapidly with temperature. After wicking, all samples were intact.

Figure 4:
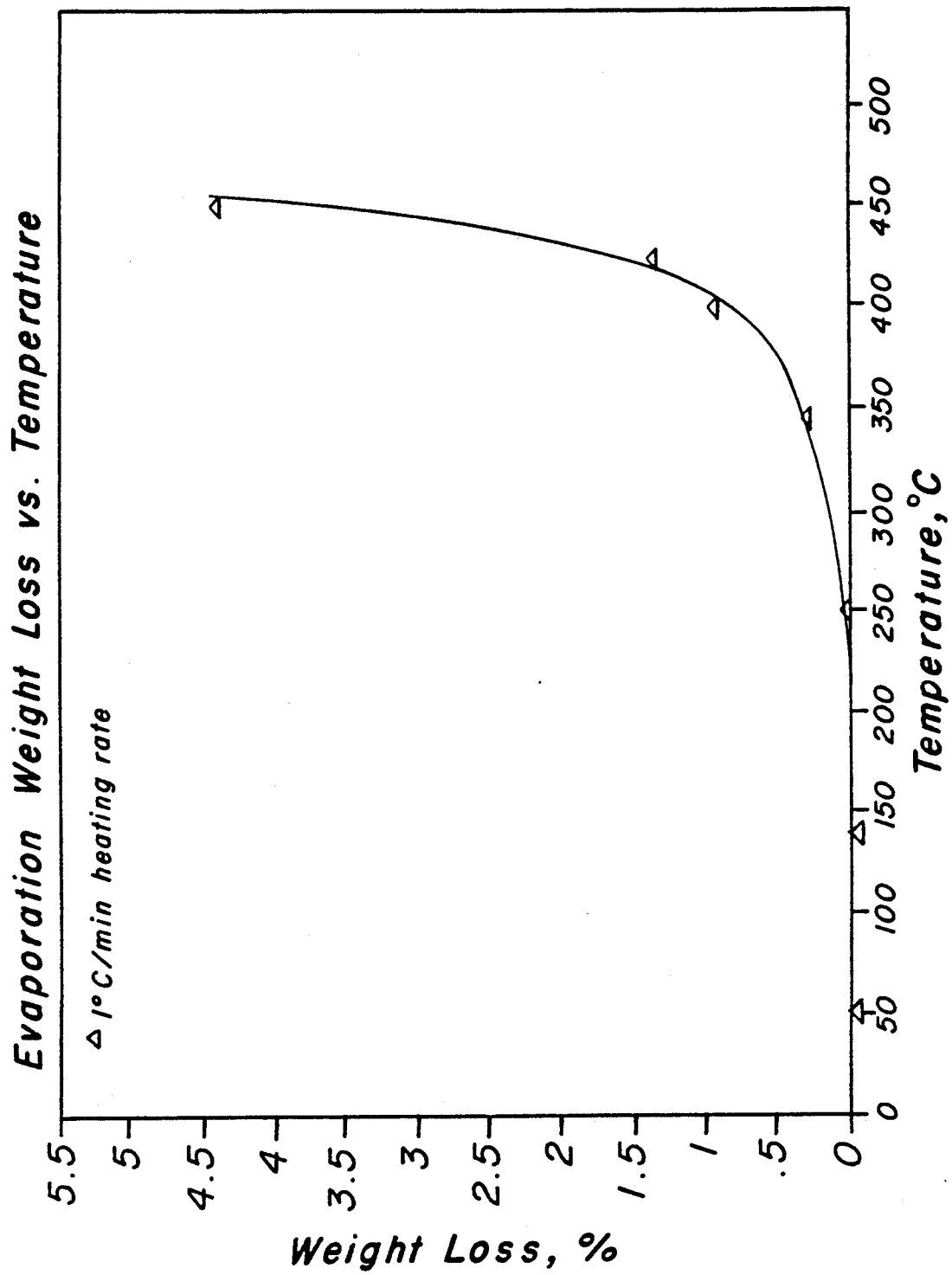
FIG. 4 is a graph plotting weight loss of binder against temperature for a sample which was slowly heated, but in the absence of a wicking medium.

By comparison, FIG. 4 shows the result of an experiment that was conducted in the absence of a wicking medium. The same type of sample as used for FIG. 3 was slowly heated at a rate of 1° C./min. to each temperature without wicking medium. At 250° C., weight loss is still practically zero. Only as more binder decomposes with temperature, does the weight loss increase. Substantial decomposition occurred between 400° C. and 450° C., resulting in a weight loss rise from 1% to 4.4% by weight. However, after 250° C., all samples were cracked.

The samples were prepared as follows:

3.1 micrometer heavy alloy W-Ni-Fe powder, having the composition shown in Table 1, was mixed with an equal volume of polyethylene wax binder having the composition shown in Table 2. This corresponded to a binder content of 4.9% by weight. Generally, a batch employed 4 grams (g) of binder and 77.8 g of powder.

Instead of mixing and molding in an injection molding machine, some simulated steps were adopted to prepare the powder compact. To mix, the weighed polyethylene was melted at 110° C. in a beaker on a hot plate, metal powder was then added to the melt, stirred manually for ten minutes, and air cooled to room temperature. To prepare feed stock for powder compact, the mixture was cut into long 5 to 10 mm pieces.

To simulate injection molding, 6 g of powder/binder mixture were pressed in a die with a one half inch (12.7 mm) plunger at 25 MPa. The die and compact as a whole was then heated in an oven at 90° C. for fifteen minutes. Re-pressing the compact at 36 MPa yielded the final specimen. The cylindrical or disc-shaped sample 30 resulted, having a thickness of about 5.2 mm, and a green density of 9.1 g/cc. The samples generally, were 6 g in weight and 12.7 mm in diameter. Samples having thicknesses of 5.2 mm and 10.4 mm were utilized.

TABLE 1

| Powder Characteristics | |
| --- | --- |
| Material | Premixed W, Ni, and Fe powder |
| Composition | 93% W, 4.9% Ni, and balance Fe (by weight) |
| Theoretical density | 17.82 g/cc |
| Source | Teledyne lot #600 |
| Fisher subsieve size | 3.1 μm |

TABLE 2

| Binder Characteristics | |
| --- | --- |
| Material | A-C Polyethylene, Homopolymers, lot 6 |
| Source | Allied Corp., N.J. |
| Mettler drop point (ASTM D-3104) | 106° C. |
| Hardenss dmm (ASTM D-5) | 4.0 |
| Density (ASTM D-1505) | 0.92 g/cc |
| Viscosity-cps at 140° C. (Brookfield) | 350 |
| Acid number (mg KOH/g) | nil |

The binder content was 4.9% by weight, or 48.6% by volume. The wicking medium was a nominal one micrometer alumina powder (Linde Division, Union Carbide). The compact was embedded in loosely packed and thus freely deformable alumina powder in an alumina boat with a size of 20 mm in diameter and 15 mm in height. Debinding in the first stage employed a constant rate of heating from room temperature to temperatures lower than 450° C. Heating rates were not greater than 10° C./min. The temperatures in the first stage, thus, rose above the melting point of the binder, but stayed below the vaporization or decomposition thereof. The partially debinded samples were then removed from the wicking powder for weight measurements and weight loss determinations. A subsequent 450° C. isothermal treatment for one hour, without the alumina wick, was employed, to further remove binder. This formed the second stage of the debinding process. All debinding was in a dry hydrogen atmosphere, with a dew point less than −50° C.

As shown in FIG. 3, wicking is an effective way to remove some binder. It was found that any compact with more than 1.92% by weight of binder removed in the wicking process (corresponding to approximately 40% of the total binder in the compact), and subsequent isothermal treatment at −450° C. for one hour will remove all the remaining binder with compact shape retained. However, for a compact with less than 1.40% by weight of binder removed initially (approximately 30% of the binder), the subsequent isothermal treatment resulted in cracks in the sample, despite total binder removal. This confirms the transitional behavior between 30% and 40% binder removal by wicking. The second isothermal (one hour at 450° C.) debinding stage proves unpredictable if less than 40% of the binder is removed in the first wicking stage. The critical amount of binder removal (1.92% by weight) applies both to the single thickness samples (5.2 mm thick) and to the double thickness samples (10.4 mm thick). Fully debinded samples were then treated at 700° C. for one hour to gain some strength for handling.

According to the present invention, the pore channels of the powder compacts presumably begin to open to the outside atmosphere if a critical amount of binder is removed. Therefore, the vapor from the decomposed and vaporized polyethylene binder can move out of the compact through these channels more easily without cracking the sample. A successful two-stage debinding process of the present invention can take place in less than two hours. This compares extremely well with the 20 days that are needed for debinding by using slow heating only.

In another experiment conducted to confirm the usefulness of the present invention, paraffin, which has a lower softening point than polyethylene was used as the binder. Paraffin also has a lower viscosity compared to polyethylene, which aids in debinding at lower temperatures. In this experiment, the paraffin used (Paraseal Wax, W & F Manufacturing Co., Buffalo, N.Y.) melted readily below 60° C., and had a density of 0.886 g/cc.

In a manner which was analogous to the preparation of the polyethylene binder compacts, 6.5 g paraffin and 80.4 g W-Ni-Fe powder were mixed at 60° C. Five grams of mixture were then pressed at 25 MPa, and held at 52° C. for ten minutes. Repressing took place at 36 MPa. The final sample size was the same as that for the polyethylene binder compacts.

Debinding by wicking was performed in an oven under ambient atmosphere. The sample was heated from room temperature to 92° C. in fifteen minutes and held for eighteen minutes. The debinded sample was intact in shape with 68% of the original binder removed. The sample was adequate for second stage debinding and following sintering.

The present invention thus utilizes a two-stage approach for fast debinding of injection molded powder compacts. The first stage involves the removal of a critical amount of binder from the compact, preferably through wicking. The subsequent second stage involves evaporation and/or decomposition of the remaining binder by fast heating to high temperatures.

The present invention can be utilized with powders including metals, ceramics, cermets (combinations of ceramic and metal powders) and composites. A variety of waxy or other binders can be utilized, which have relatively low melting points and moderate vaporization and/or decomposition temperatures.

According to the present invention, in addition to supporting the compact in freely deformable porous powder, the compact may also be supported on a freely deformable cloth like sheet made of heat resistant material such as ceramic, for example alumina fibers or other ceramic material fibers. It is important, whether the powder or the cloth is used, to provide the powder or cloth with a smaller pore size than the pore size of particle in the compact (measured without binder). This produces a differential in pressure, due to capillary action, between the compact and the wicking medium, which tends to forcefully draw the melted binder from the compact into the wicking medium. Because of this action, extremely fast heating rates can be used during both steps of the process, in particular, rates to 5° C. to 10° C. per minute.

While a specific embodiment of the invention has been showed and described in detail to illustrate the application of the principles of the invention, it will be understood that the invention may be embodied otherwise without departing from such principles.

The invention claimed is:

1. A process for making a molded object, comprising:
   mixing a waxy binder with a powder including at least one of powdered metal, powdered ceramics, powdered cermets and powdered composites to form a mixture having about from 15% to 50% by volume binder and particles of up to 100 microns in size;
   compressing the mixture under heating and pressure to form a compact containing binder and having a powder portion with a pore size;
   supporting the compact in a wicking medium which can absorb melted binder by capillary action from the compact, the wicking medium comprising a freely deformable and porous wicking medium having a pore size which is smaller than the pore size of to powder portion of the compact;
   removing at least 40% of the binder from the compact in a first stage while the compact is in contact with the wicking medium, by heating the compact to a temperature above the melting point of the binder and below the vaporization and decomposition temperature of the binder, and at a rate of 5° C. to 10° C. per minute, the melted binder being received into the wicking medium from the compact by capillary action;
   removing remaining binder from the porous compact in a second steps by removing the compact from the wicking medium and thereafter exposing the porous compact to a temperature at least as high as the vaporization temperature of the binder to form a binder free compact, the second stage being conducted under isothermal conditions; and
   after the second stage, sintering the binder free compact to form the molded object.

2. A process according to claim 1 wherein the wicking medium is high temperature resistant powder.

3. A process according to claim 1 wherein the wicking medium is high temperature resistant cloth like material.

4. A process according to claim 2, wherein said high temperature resistant powder comprises alumina powder.

* * * * *